T. A. Lyle.
Fan Attachment for Sewing Mach.
Nº 91,646.                    Patented Jun. 22, 1869.
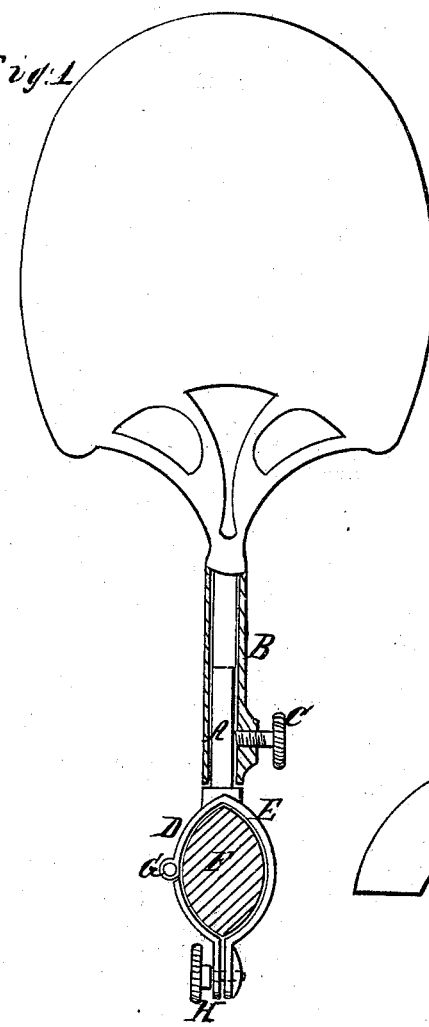
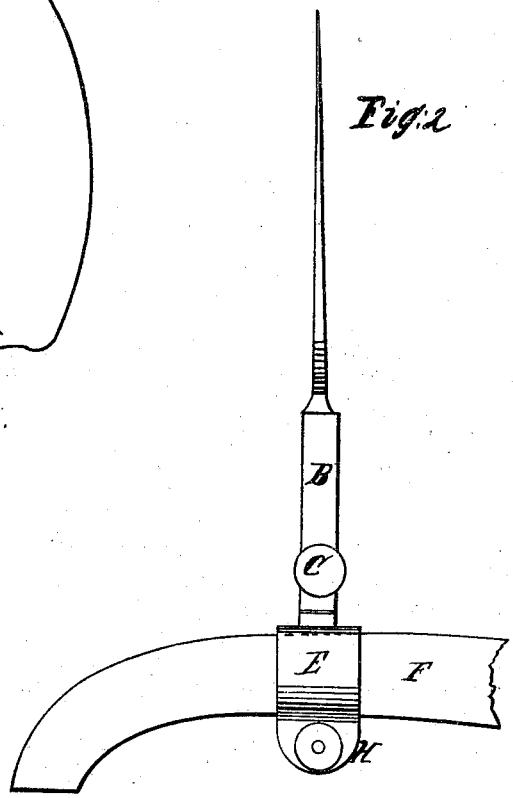
Witnesses
Inventor
T A Lyle

United States Patent Office.

THOMAS A. LYLE, OF PITTSBURG, PENNSYLVANIA.

Letters Patent No. 91,646, dated June 22, 1869.

IMPROVED FAN-ATTACHMENT FOR SEWING-MACHINES.

The Schedule referred to in these Letters Patent and making part of the same.

*To all whom it may concern:*

Be it known that I, THOMAS A. LYLE, of Pittsburg, in the county of Allegheny, and State of Pennsylvania, have invented a new and improved Fan-Attachment for Sewing-Machines; and I do hereby declare that the following is a full, clear, and exact description thereof, which will enable others skilled in the art to make and use the same, reference being had to the accompanying drawing, forming part of this specification.

The object of this invention is to provide fan-attachments for the needle-arms of sewing-machines, whereby the vibrating motion of the said arms may be utilized to operate the said fans for the benefit of the person working the machine, or others, as preferred.

The invention consists in combining the needle-arms of sewing-machine fans with clamping-devices suited to the needle-arms of any machine, and adapted to be readily detached when not wanted, or adjusted so as not to disturb the air, or act thereon to produce a current.

Figure 1 of the drawing represents a needle-arm of a sewing-machine in section, with a fan in elevation, attached by a clamp.

Figure 2 represents a side view of the same.

Similar letters of reference indicate corresponding parts.

A represents a spindle, for the connection of a tubular fan-stem, B, carrying a set-screw, for securing the two parts together.

The said spindle is provided with branching straps, or arms, D E, suited in form to the form of the needle-arm F, to which it is to be clamped, one of the said arms being hinged as shown at G, and both extending below the needle-arm, and provided with lugs or projecting ears H, and a set-screw for clamping them tightly around the said arm.

Other means of clamping the said spindles to the arms may be employed, as may be preferred.

When it is not required to use the fan, it may be readily detached from the spindle, or it may be so adjusted thereon as not to beat the air with its sides.

Having thus described my invention,

I claim as new, and desire to secure by Letters Patent—

The combination, with the needle-arm of a sewing-machine, of a fan-support, detachably connected to the said arm, substantially as specified.

THOMAS A. LYLE.

Witnesses:
 JOHN P. ROSS,
 JOHN W. TAYLOR.